United States Patent [19]
Mowill

[11] Patent Number: 5,481,866
[45] Date of Patent: Jan. 9, 1996

[54] SINGLE STAGE PREMIXED CONSTANT FUEL/AIR RATIO COMBUSTOR

[76] Inventor: R. Jan Mowill, Opra B.V., Opaalstraat 60-P.O. Box 838, 7550 AV Hengelo, Netherlands

[21] Appl. No.: 261,256

[22] Filed: Jun. 14, 1994

Related U.S. Application Data

[63] Continuation of Ser. No. 86,883, Jul. 7, 1993, abandoned.
[51] Int. Cl.⁶ ..................................................... F02C 9/50
[52] U.S. Cl. ......................... 60/39.23; 60/39.27; 60/737
[58] Field of Search .............................. 60/39.23, 39.27, 60/734, 736, 737, 738

[56] References Cited

U.S. PATENT DOCUMENTS

| | | |
|---|---|---|
| 1,705,383 | 3/1929 | Weiss . |
| 2,108,822 | 2/1938 | Lippincott . |
| 2,183,836 | 12/1939 | Gordon, Jr. . |
| 2,268,270 | 12/1941 | Traupel . |
| 2,469,238 | 5/1949 | Newton . |
| 2,487,514 | 11/1949 | Boestadet et al. . |

(List continued on next page.)

FOREIGN PATENT DOCUMENTS

| | | |
|---|---|---|
| 0074196 | 3/1983 | European Pat. Off. . |
| 0247984 | 12/1987 | European Pat. Off. . |
| 91102971.8 | 9/1991 | European Pat. Off. . |
| 1246455 | 10/1960 | France . |
| 2189630 | 1/1974 | France . |
| 2415203 | 8/1979 | France . |
| 748208 | 10/1944 | Germany . |
| 833739 | 3/1952 | Germany . |
| 2629761 | 5/1978 | Germany . |
| 2812237 | 5/1978 | Germany . |
| 3332959 | 3/1985 | Germany . |
| 3835415 | 5/1989 | Germany . |
| 9215856 | 2/1993 | Germany . |
| 55-45739 | 11/1980 | Japan . |
| 57-41524 | 3/1982 | Japan . |
| 283198 | 5/1952 | Switzerland . |
| 668834 | 3/1952 | United Kingdom . |
| 720436 | 12/1954 | United Kingdom . |

OTHER PUBLICATIONS

Sheperd, D. G. "Principles of Turbomachinery", New York, The Macmillan Co., 1956., pp. 282–289.
Csanady, G. T. "Turbomachines", New York; McGraw–Hill Book Co., 1964, pp. 14–23.
Cox, H. R., "Gas Turbine Princoples and Practice", D. Van Nostrand, pp. 2–26, 2–39.
Treager, E. E., "Aircraft Gas Turbine Technology", 2nd Ed., p. 10.
Fuel injector cuts NOx; Professional Engineering, Sep. 1994.
Development of an Aeroderivative Gas Turbine DLE Combustion System, Diesel & Gas Worldwide, May 1993.

Primary Examiner—Louis J. Casaregola
Attorney, Agent, or Firm—Finnegan, Henderson Farabow, Garrett & Dunner

[57] ABSTRACT

An annular combustor system is disclosed in use with a radial turbine-type gas turbine engine module, the system having an annular housing defining a single stage combustor, an external fuel/air premixer system having a mixing chamber and a compressed air valve and a fuel valve both under the control of a controller, to provide a preselected lean fuel/air ratio mixture for introduction to the combustion zone of the annular housing. Compressed air conduits are used to channel a portion of the total compressed air flow to the premixer and the remainder to the dilution zone of the combustor, and a fuel conduit is used to deliver all of the fuel to the premixer. Convection cooling of the annular housing is accomplished using compressed air without diluting the fuel air ratio in the combustion zone. The premixer includes a venturi, a fuel nozzle for spraying fuel into the venturi inlet along the venturi axis, and a premixer housing integrating the compressed air valve, the venturi axis being aligned substantially tangentially to the annular housing axis to provide a swirling admission of the premixed fuel/air mixture to the combustion zone.

16 Claims, 5 Drawing Sheets

U.S. PATENT DOCUMENTS

| | | | |
|---|---|---|---|
| 2,488,969 | 11/1949 | Dietler. | |
| 2,489,939 | 11/1949 | Traupel. | |
| 2,513,601 | 7/1950 | Traupel. | |
| 2,608,822 | 9/1952 | Pavlecka et al.. | |
| 2,621,475 | 12/1952 | Loy. | |
| 2,625,012 | 1/1953 | Larrecq. | |
| 2,663,141 | 12/1953 | Hage. | |
| 2,675,673 | 4/1954 | Mallinson et al.. | |
| 2,837,894 | 6/1958 | Kind. | |
| 2,988,884 | 6/1961 | Pouit. | |
| 2,999,359 | 9/1961 | Murray. | |
| 3,091,080 | 5/1963 | Crim et al.. | |
| 3,099,134 | 7/1963 | Calder et al.. | |
| 3,204,406 | 9/1965 | Howes et al.. | |
| 3,315,467 | 4/1967 | De Witt. | |
| 3,626,444 | 12/1971 | Caruel et al.. | |
| 3,765,170 | 10/1973 | Nakamura. | |
| 3,768,962 | 10/1973 | Baranowski, Jr.. | |
| 3,869,865 | 3/1975 | Lacroix et al.. | |
| 3,905,192 | 9/1975 | Pierce et al. | 60/737 |
| 3,958,413 | 5/1976 | Cornelius et al. | 60/39.23 |
| 4,012,904 | 3/1977 | Nogle. | |
| 4,030,288 | 6/1977 | Davis et al.. | |
| 4,073,137 | 2/1978 | Roberts. | |
| 4,192,139 | 3/1980 | Buchheim. | |
| 4,215,535 | 8/1980 | Lewis. | |
| 4,255,927 | 3/1981 | Johnson et al.. | |
| 4,260,367 | 4/1981 | Markowski et al.. | |
| 4,286,430 | 9/1981 | Smith. | |
| 4,297,842 | 11/1981 | Gerhold et al.. | |
| 4,301,657 | 11/1981 | Penny. | |
| 4,305,255 | 12/1981 | Davies et al.. | |
| 4,356,698 | 11/1982 | Chamberlain | 60/737 |
| 4,389,848 | 6/1983 | Markowski et al.. | |
| 4,412,414 | 11/1983 | Novick et al. | 60/39.23 |
| 4,457,704 | 7/1984 | Sommers et al.. | |
| 4,610,135 | 9/1986 | Alexander. | |
| 4,641,495 | 2/1987 | Mowill. | |
| 4,700,542 | 10/1987 | Wang. | |
| 4,702,070 | 10/1987 | Cureton et al.. | |
| 4,747,262 | 5/1988 | Maynard. | |
| 4,766,721 | 8/1988 | Iizuka et al.. | |
| 4,829,764 | 5/1989 | Iizuka et al.. | |
| 4,838,029 | 6/1989 | Gleason et al.. | |
| 4,845,944 | 7/1989 | Rodgers. | |
| 4,845,952 | 7/1989 | Beebe. | |
| 4,893,466 | 1/1990 | Egnell et al.. | |
| 4,898,001 | 2/1990 | Kuroda et al.. | |
| 4,928,481 | 5/1990 | Joshi et al.. | |
| 4,944,149 | 7/1990 | Kuwata. | |
| 4,966,001 | 10/1990 | Beebe. | |
| 4,974,415 | 12/1990 | Shekleton et al.. | |
| 5,016,443 | 5/1991 | Shimizu et al.. | |
| 5,069,029 | 12/1991 | Kuroda et al.. | |
| 5,070,700 | 12/1991 | Mowill. | |
| 5,081,832 | 1/1992 | Mowill. | |
| 5,156,002 | 10/1992 | Mowill. | |
| 5,214,911 | 6/1993 | Shekleton | 60/737 |
| 5,218,824 | 6/1993 | Cederwall et al. | 60/737 |
| 5,257,499 | 11/1993 | Leonard | 60/737 |

SINGLE STAGE PREMIXED CONSTANT FUEL/AIR RATIO COMBUSTOR

This application is a continuation, of application Ser. No. 08/086,883 filed Jul. 7, 1993, now abandoned.

BACKGROUND OF THE INVENTION

1. Field of the Invention

This invention relates to a combustion system for gas turbine engines or other heat devices, which need to produce very little oxides of nitrogen or carbon monoxide. Specifically, the present invention relates to a system, process, and apparatus for combusting fuel in a gas turbine engine module which dramatically lowers $NO_x$ and CO levels by providing a nearly constant fuel/air ratio in the combustion zone at all engine operating conditions in addition to thoroughly pre-mixing the fuel and air prior to combustion and, if necessary, completely vaporizing a liquid fuel.

2. Description of the Art

Although gas turbine engines do not produce the majority of the nitrogen oxide emissions released into the earth's atmosphere, reducing those emissions will reduce the total and, in that regard, many countries have enacted laws limiting the amounts that may be released. The reaction of nitrogen and oxygen in the air to form nitrogen oxides, like almost all chemical reactions, proceeds faster at higher temperatures. One way to limit the amount of $NO_x$ formed is to limit the temperature of the reaction. The $NO_x$ produced in gas turbine engines is produced in the combustion process where the highest temperature in the cycle normally exists. Therefore, one way to limit the amount of $NO_x$ produced is to limit the combustion temperature.

Various attempts have been made to limit the combustion temperature and thereby $NO_x$ production in both "single stage" combustors (i.e., those having only a single combustion zone where fuel and air are introduced) and "multi-stage" combustors, including pilot burners where several, serial connected combustion zones having separate fuel and air introduction means are used. U.S. Pat. No. 4,994,149, U.S. Pat. No. 4,297,842, and U.S. Pat. No. 4,255,927 disclose single stage gas turbine combustors where the flow of compressed air to the combustion zone and the dilution zone concentration of $NO_x$ in the turbine exhaust gases. In the of an annular combustor are controlled to decrease the above combustors, essentially unmixed fuel and air are separately admitted to the combustor, with mixing and combustion consequently occurring within the same chamber. See also Japanese Laid-Open No. 55-45739. U.S. Pat. No. 5,069,029, U.S. Pat. No. 4,898,001, U.S. Pat. No. 4,829,764, and U.S. Pat. No. 4,766,721 disclose two stage combustors. See also German Gebrauchsmuster, 99215856.0. Again, however, fuel and air are provided to each stage at least partially unmixed with complete mixing occurring within the respective combustion zones.

Attempts also have been made to utilize separate premixer chambers to provide a premixed fuel-air flow to a combustor. Japan Laid-Open Application No. 57-41524 discloses a combustor system which appears to premix only a portion of the total fuel flow to a multistage can-type combustor in a separate mixing chamber prior to introduction to the staged combustion chambers. In U.S. Pat. No. 5,016,443, a large number of separate fuel nozzles is used to inject fuel into an annular premixer chamber. However, the complexity of the above constructions employing multiple fuel nozzles and fuel splitting devices can lead to control difficulties, as well as a high initial cost.

SUMMARY OF THE INVENTION

Thus, it is an object of the invention to provide a combustor apparatus for use with gas turbine engine modules, which apparatus results in low emissions of both $NO_x$ and unburned fuel and fuel by-products over the entire operating range of the gas turbine engine module.

It is a further object of the present invention to provide an apparatus that is relatively less complex than other state of the art particularily annular combustor systems thereby facilitating ease of operation, lower initial cost of the apparatus, and substantially improved fuel/air control by the avoidance of matching a large number of separate premixers.

In accordance with the present invention as embodied and broadly described herein, the combustor system for operation with a source of compressed air and a source of fuel comprises a cylindrical housing defining a single stage combustion chamber, the housing having an axis and having at least one inlet port adjacent one chamber end, the portion of the chamber adjacent said one chamber end comprising a combustion zone. The housing also has an exhaust port at the opposite axial chamber end, the portion of said chamber adjacent the opposite axial end comprising a dilution zone, the housing also having aperture means into the dilution zone. The combustor system also includes at least one fuel/air premixer disposed outside the housing and having means for receiving compressed air, means for receiving fuel, and premixer chamber means for mixing the received compressed air and fuel and delivering the mixture to the combustion zone through the inlet port. The combustion system also includes first conduit means interconnecting the source of compressed air and the premixer and, with the premixer compressed air receiving means, establishing a compressed air flow path for delivering a portion of the compressed air to the premixer, and for delivering essentially the remaining portion of the compressed air to the aperture means.

The combustor system further includes second conduit means interconnecting the fuel supply and the premixer fuel receiving means and, together with the premixer fuel receiving means, establishing a flow path for all the fuel to the premixer. The combustor system still further includes first valve means disposed in the compressed air flow path for determining the compressed air flow rate therein, and second valve means disposed in the fuel flow path for determining the fuel flow rate therein. The combustor system yet further includes controller means operatively connected to the first and second valve means for essentially controlling the respective flow rates of the compressed air portion and fuel to the premixer to provide a preselected lean fuel/air ratio mixture through the inlet port to the combustion zone.

Preferably, the premixer chamber means includes a venturi having an inlet, an outlet, and a flow axis. The venturi inlet is flow connected to the compressed air receiving means and the fuel receiving means, and the outlet is connected to the housing inlet port to deliver the fuel/air mixture to the combustion zone. The venturi is disposed with the flow axis aligned in a substantially tangential direction with respect to the cylindrical housing axis to provide a swirling combustion pattern in the combustion zone.

It is also preferred that the premixer fuel receiving means includes a single fuel nozzle positioned to direct a fuel stream into the venturi inlet substantially along the venturi axis; that the fuel nozzle is spaced from the venturi inlet along the venturi axis direction to provide an inlet flow path for the compressed air into the venturi inlet; and that a flow-smoothing member is positioned in the venturi inlet flow path.

The present invention as embodied and broadly described herein also provides a process for operating a gas turbine engine module to minimize $NO_x$ and unburned fuel and fuel by-products, the gas turbine engine module of the type having an cylindrical housing with an axis and defining a combustion chamber, the housing having at least one inlet port proximate one axial end, the chamber portion adjacent the one axial end comprising a combustion zone, and an exhaust port and aperture means proximate the other axial end, the chamber portion adjacent the other axial end comprising a dilution zone. The process of the present invention comprises the steps of supplying compressed air flow and fuel flow to the vicinity of the housing; continuously premixing the entirety of the fuel flow with a portion of the compressed air flow outside the housing and injecting the resulting fuel/air mixture into the combustion zone through the housing inlet port in a direction and with a velocity to provide swirling combustion about the housing axis; admitting the remainder of the compressed air flow to the dilution zone through the aperture means; and controlling fuel flow rate and the compressed air portion flow rate to provide a mixture with an essentially predetermined lean fuel/air ratio over substantially the entire operating range of the gas turbine engine module.

The technical considerations for the above-described invention involve the dynamics of the combustion process. The amount of nitrogen oxide in the exhaust can be expressed by the following equation:

$$NO_x = 3.2 * 10^{-6} * EXP(7.97 * 10^{-3} * T)\sqrt{P}$$

where T is the flame temperature in degrees Kelvin, $NO_x$ is the nitrogen oxide concentration coming out of the combustion zone, expressed as $NO_2$, in parts per million by volume, and P is the pressure in atmospheres. The flame temperature is a function of both the fuel/air ratio for completely premixed mixtures and of the combustor inlet air and fuel temperatures. Experience has shown that the flame in a combustor will continue to burn if the flame temperature is above about 2550 degrees Rankine (1417 degrees Kelvin) for pure fuels, or slightly higher for fuels containing a noncombustible diluent, such as nitrogen. However, at this level, the flame is close to extinction and the carbon monoxide emissions are high.

To have acceptably low levels of both pollutants, it is desirable to establish a fuel/air ratio that, in conjunction with the combustor inlet temperatures, will produce a flame temperature of about 2800 to 3000 degrees Rankine (1556 to 1667 degrees Kelvin). Use of the equation will show that the $NO_x$ levels will be between 0.8 and 2.0 ppmv (parts per million by volume) at one atmosphere before the dilution air is added to reduce them still more. Experience also has shown that carbon monoxide levels at these temperatures will be below 20 ppmv and will be even lower at higher pressures.

The constant fuel/air ratio in the combustion chamber of the present invention is produced by adjusting the air flow to the premixer to be proportional to the fuel flow. Experience has shown that it is not enough to Just limit the average temperature because, when a fuel is burned as drops of liquid or a diffusion gas flame, the combustion proceeds at near the stoichiometric value and the local temperature is very high, thus producing excessive $NO_x$. To produce the lowest possible $NO_x$, the annular combustor of the present invention thoroughly pre-mixes all the fuel and combustion air in a venturi chamber separate from the combustion chamber itself, and if a liquid fuel is used, evaporates the fuel before premixing the fuel and air to be used in the combustion. Some gas turbine engine applications exhibit a nearly constant air flow regardless of power level (primarily single shaft direct-coupled electricity producers which must run at constant speed) and some have an air flow that decreases as the power level is reduced (such as free turbine units and propulsion units). To maintain a constant fuel/air ratio in both types of units, it is necessary to provide an air valve, coupled to the fuel valve, which provides the amount of air needed for a nearly constant fuel/air ratio. Obviously the valves will be different in the two types of engines, but the principle is the same.

In this invention only one combustion zone is used and the fuel/air ratio and flame temperature will always be high enough to effectively burn the carbon monoxide and hydrocarbons. Therefore, this invention not only produces low emissions of nitrogen oxides, but low emissions of carbon monoxide and unburned hydrocarbons as well by avoiding transition zones between stages of combustion. Since this invention has only one combustion zone, it is not necessary to separate a primary and secondary combustion zone (multistage combustor) or to cool such a separation. Also, it is not necessary to use a pilot flame or associated apparatus. Furthermore, the control system is vastly simplified by having one fuel control valve which must be precise and one air control valve which is more forgiving where accuracy and leakage are concerned.

The air-fuel mixing devices particularly described and shown in detail hereinafter, provides a nearly uniform fuel/air weight ratio at its exit. Of course, it is necessary to keep the axial velocity above the turbulent flame speed at all points within the venturi and to prevent any recirculation within the fuel/air mixing system. If these requirements are met, combustion cannot occur before the fuel/air mixture leaves the premixing device.

Other objects and advantages of the invention will be set forth in part in the description which follows, and in part will be apparent from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitutes part of the specification, illustrate preferred embodiments of the invention and, together with the description serve to explain the principles of the invention.

In the drawings.

DESCRIPTION OF THE PREFERRED EMBODIMENTS

Reference will now be made to the present preferred embodiment of the invention which is illustrated in the accompanying drawings.

Figures 1A, 1B:
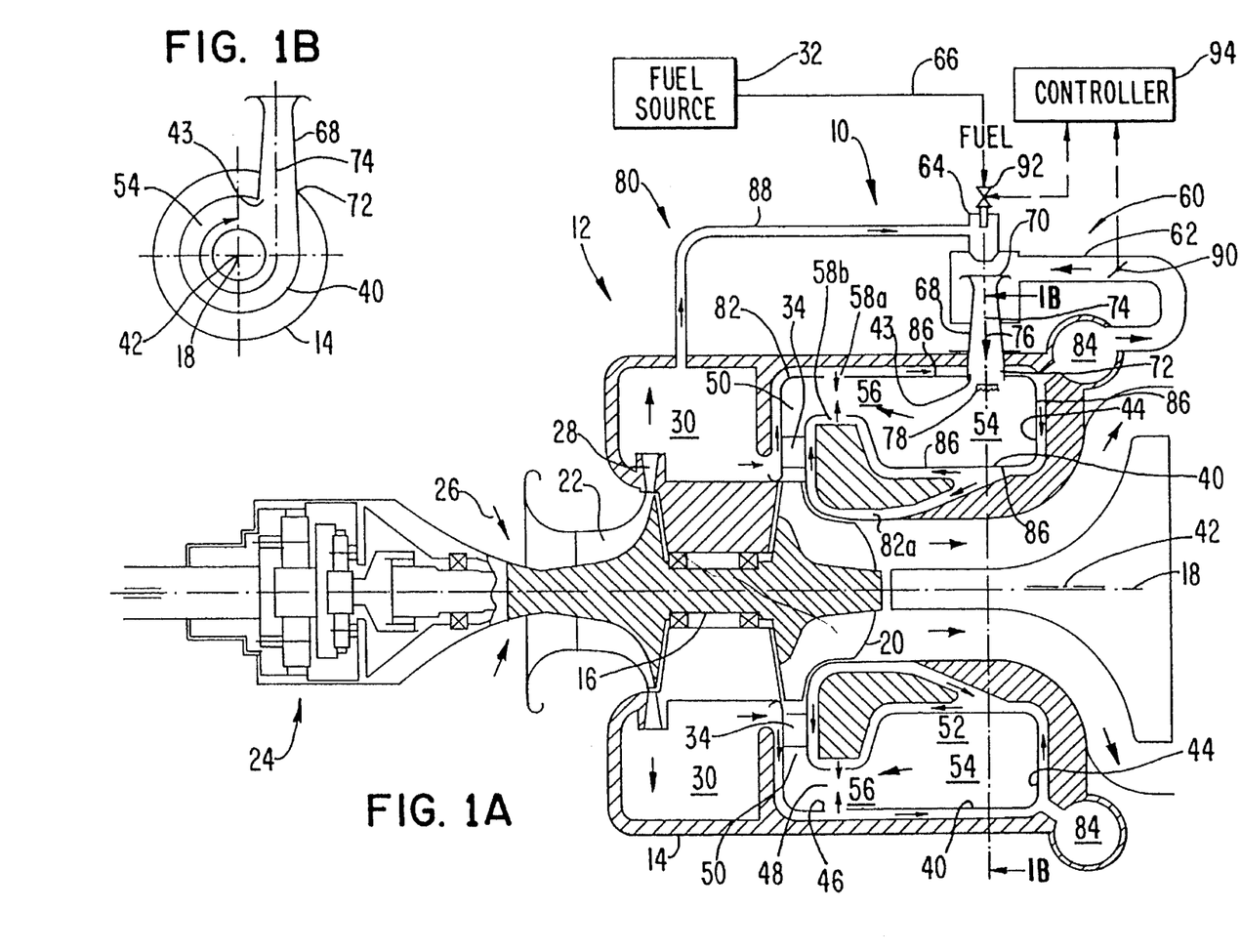
FIG. 1A is a cross sectional schematic of a gas turbine engine module utilizing a combustor system made in accordance with the present invention.
FIG. 1B is a schematic end view of the apparatus shown in FIG. 1A taken in the direction AA in FIG. 1A.

With initial reference to FIG. 1A, there is shown a combustor system made in accordance with the present invention and designated generally by the numeral 10. System 10 is depicted as being used in conjunction with radial gas turbine engine module 12. Gas turbine engine module 12 includes a pressure housing 14 within which is mounted shaft 16 rotatable about axis 18. Mounted on one end of a shaft 16 is radial turbine 20 for driving centrifugal compressor 22 mounted at the opposed end of shaft 16. In the configuration depicted in FIG. 1A, gas turbine engine module 12 power is taken out through a mechanical coupling arrangement shown generally at 24 adjacent centrifugal compressor 22. However, the combustor system and gas turbine engine module of the present invention can be utilized in association with a "free power turbine" (not shown), or any other turbine engine version as one skilled in the art would immediately realize. Also, the present invention is not limited to use with radial gas turbine engine modules but, at least in its broadest extent, could be used with axial or mixed axial-radial turbine engine modules as well.

With continued reference to FIG. 1A, gas turbine engine module 12 operates generally as follows. Air enters centrifugal compressor 22 in a direction designated by the arrows 26, is centrifugally accelerated to increase its velocity, whereupon it enters diffuser 28 to increase static pressure. The compressed air exiting diffuser 28 is collected in a plenum chamber 30. Thereafter, compressed air from plenum 30 is mixed with fuel from a fuel source 32 by means of premixer 60 of combustor system 10, to be described in more detail hereinafter, to produce hot exhaust gases which flow past inlet guide vanes 34 to radial turbine 20, where power is extracted. The exhaust gases from turbine 20 are ducted to the atmosphere or to a subsequent engine module. In the case of free power turbine arrangement, the gases exiting turbine 20 would be ducted to the free power turbine for extraction of further power.

In accordance with the present invention, the combustor system includes a cylindrical housing defining a combustion chamber, the housing having an axis and having at least one inlet port adjacent one axial chamber end. Importantly, the portion of the chamber adjacent the one axial chamber end comprises a single stage combustion zone. An exhaust is positioned at the opposite axial chamber end, with the portion of the combustion chamber adjacent the opposite axial chamber end comprising a dilution zone. The housing further has aperture means in the form of dilution ports in flow communication with the dilution zone.

As embodied herein, and with continued reference to FIG. 1A, combustor system 10 includes annular combustor liner housing 40 which is generally toroidal in shape. Although the preferred embodiment is illustrated with an annular housing, a "can-type" cylindrical housing could also be used. Housing 40 is contained within pressure vessel 14 and defines an axis 42 essentially coincident with gas turbine engine module axis 18. Housing 40 is closed at axial end 44 except for inlet port 43, but is open at axial end 46 to form an annular exhaust port 48. Exhaust port 48 is in flow communication with radial turbine 20 through channel 50 past inlet guide vanes 34.

With continued reference to FIG. 1A, toroidal chamber 52 defined by housing 40 comprises two generally axial sections with different functions. Section 54 adjacent axial end 44 comprises a single stage combustion zone and section 56 adjacent housing end 46, comprises a dilution zone. A plurality of apertures 58a, 58b are provided in housing 40 opening into dilution zone 56. Dilution ports 58a are a series of apertures formed in the outer peripheral surface of housing 40, while dilution ports 58b are a series of apertures formed in an inner peripheral surface of housing 40, relative to housing axis 42. The aperture means generally comprising dilution ports 58a, 58b provide for the introduction of compressed air into the dilution zone 56 of combustion chamber 52 from compressed air conduit means which will be described in more detail hereinafter. However, dilution apertures need not be placed in both inner and outer walls of the combustion liner. For example, aperture 58a may be eliminated if apertures 58b are used and sized to accommodate the entire dilution flow rate.

Further in accordance with the present invention, at least one fuel/air premixer disposed outside the cylindrical housing is provided for mixing a portion of the compressed air flow with fuel to provide a fuel/air mixture and delivering the mixture to the combustion zone through the inlet port. The fuel/air premixer includes means for receiving the compressed air, means for receiving the fuel and also chamber means for flow-smoothing the received compressed air and for mixing the received compressed air and fuel. As embodied herein and with continued reference to FIG. 1A, combustion system 10 further includes a single fuel/air premixer designated generally by the numeral 60. Premixer 60 includes housing assembly 62 for receiving the compressed air from conduit means which will be described in more detail hereinafter, and a single fuel nozzle 64 for receiving fuel from fuel source 32 via fuel line 66. Fuel nozzle 64 depicted in FIG. 1A is an "air-blast" type fuel nozzle especially advantageous for use with liquid fuel to provide atomization and thus enhance vaporization. However, use of an "air blast" nozzle with gaseous fuel can provide benefits in terms of providing an initial mixing of the fuel with air prior to admission to the venturi element which will be described hereinafter. Therefore, the combustion system of the present invention is not restricted to the use of liquid fuel or an "air-blast" fuel nozzle, but gaseous fuel and other types of fuel nozzles, such as swirling-type nozzles, can be used as well.

Fuel/air premixer 60 further includes mixing chamber means in the form of venturi 68 having venturi inlet 70 disposed within fuel/air premixer housing assembly 62 and venturi exit 72 connected to inlet port 43. Venturi 68 defines a flow axis 74, and fuel nozzle 64 is positioned to deliver a fuel spray into venturi inlet 70 substantially along axis 74. The cross sectional flow area and dimensions of venturi 68 are chosen to provide vigorous and complete mixing of the fuel and compressed air within the venturi chamber and a directed flow of the resulting mixture along venturi axis 74 to combustion zone 54, such as indicated schematically by arrow 76. The flow area of venturi exit 72 should be chosen such that minimum velocities of the mixture (i.e., during idle) are greater than the flame propagation speed of the fuel/air mixture. Flame holder means such as depicted schematically as 78 may be provided proximate venturi exit 72 to enhance the stability of combustion in combustion zone 54.

As best seen in FIG. 1B, mixing venturi 68 is disposed such that venturi axis 74 is oriented substantially tangentially with respect to housing axis 42 such that the incoming fuel/air mixture is caused to swirl about axis 42 within the combustion zone 54. It has been found using the preferred premixer construction to be described in more detail henceforth that combustion chamber 52 can be adequately fed by using only a single fuel/air premixer fed by a single fuel nozzle. However, the present invention contemplates the possible use of multiple fuel/air premixers, particularly for situations wherein the radial "thickness" of combustion chamber 52 is small relative to the outer radius thereof, as measured from axis 42.

Further in accordance with the present invention, compressed air conduit means are provided interconnecting the source of compressed air and the fuel/air premixer for delivering a portion of the compressed flow to the premixer compressed air receiving means and for delivering essentially the remaining portion of the compressed air flow to the aperture means for providing dilution air to the dilution zone. As embodied herein, and with continued reference to FIG. 1A, compressed air conduit means designated generally by the numeral 80 includes generally annular passageway 82 disposed between pressure housing 14 and housing 40. Passageway 82 extends between compressed air receiving plenum 30 and a ring-shaped plenum 84 and is formed as part of pressure vessel 14 adjacent the turbine exhaust section. Fuel/air premixer housing assembly 62 is connected to receive compressed air from plenum 84 for eventual communication to the venturi inlet 70 as explained previously. Plenum 84 is shown having a circular cross section but other shapes, configurations and locations are possible and are considered within the scope of the present invention.

As can be appreciated from the schematic in FIG. 1A, passageway 82 is configured such that the compressed air flowing therein provides cooling for housing 40, particularly housing portion 86 immediately surrounding the combustion zone 54 where the highest combustion temperatures are expected. Portion 86 of housing 40 is constructed for convection cooling only, with no film-cooling necessary. That is, in portion 86 of housing 40, the housing acts to seal off the compressed air flowing in passageway 82 from the fuel/air mixture being combusted in combustion zone 54. This construction provides for better control of the fuel/air ratio of the mixture in combustion zone 54 and permits operation as a "single stage combustor" with a desired lean fuel/air ratio. Such an operation can yield low levels of $NO_x$ and unburned fuel and fuel by-product levels. As will be discussed henceforth, the particular construction of the extraordinarily low levels of $NO_x$ in comparison with other combustor system of the present invention permits state of the art combustion systems.

Passageway 82 essentially envelopes combustion chamber 52 to provide convection cooling and also to supply compressed air to dilution ports 58a and 58b. Passageway 82 also may include a channel 82a for channeling compressed air flow for cooling the portion of the pressure vessel 14 adjacent turbine 20, as is shown in FIG. 1A. Turbine inlet guide vanes 34 may be air cooled inlet guide vanes and may be fed from passageway 82 or 82a. Also, compressed air conduit means 80 can include a separate passageway 88 interconnecting the compressed air receiving plenum 30 and air-blast fuel nozzle 64 when such a nozzle is used, particularly with liquid fuel operation.

As would be understood from the foregoing discussion in conjunction with FIG. 1A, compressed air conduit means 80 acts to channel a portion of the compressed air flow to the fuel/air premixer 60 and to channel essentially the remaining portion of the compressed air flow to the dilution ports 58a and 58b. The compressed air flow not channeled to either the fuel/air premixer or the dilution ports, namely the air used to cool the inlet guide vanes 34, is very small and in any event results in a small further dilution of the exhaust gases prior to entry into turbine 20.

Further in accordance with the present invention, valve means are disposed in the compressed air flow path for determining the compressed air flow rate to the premixer. As embodied herein and with continued reference to FIG. 1A, valve 90 is positioned in fuel/air premixer housing assembly 62 for determining the rate of compressed air flow from plenum 84 to venturi inlet 70. Valve 90 is continuously adjustable, and a suitable construction of valve 90 will be discussed in more detail hereinafter in relation to the description of the preferred construction of the fuel/air premixer of the present invention. When the valve opening changes, the pressure drop over the premixer changes, resulting in an increase or decrease of air mass flow to the dilution zone. Thus, this variation and dividing of the air flow happen outside the combustor proper.

Figure 2:
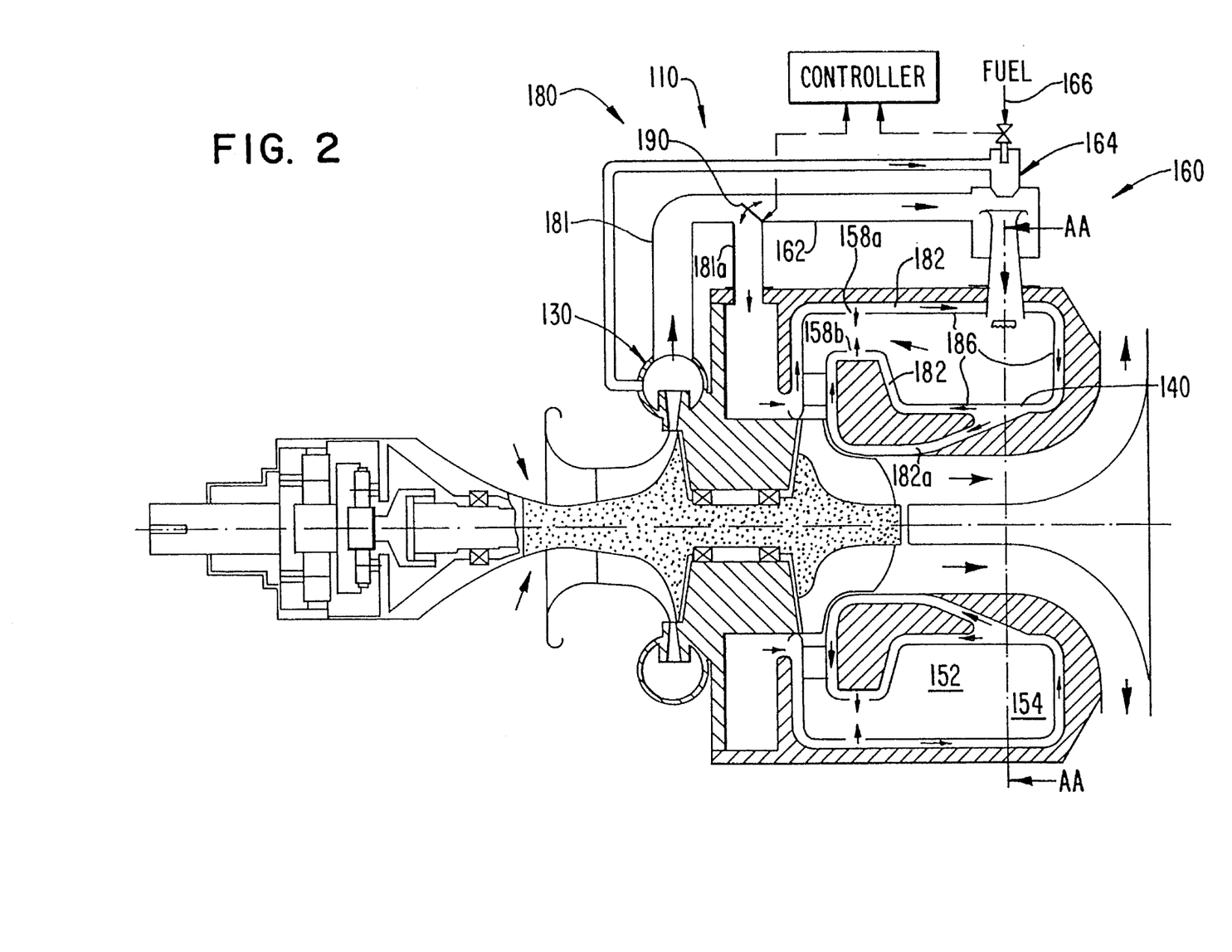
FIG. 2 is a schematic cross section of a gas turbine engine module with an alternative version of the combustor system shown in FIG. 1A.

FIG. 2 discloses combustor system 110 having an alternate configuration for the compressed air conduit means. Components having the same or similar function relative to the embodiment in FIGS. 1A, 1B are given the same numeral but with a "100" base. In the compressed air conduit means designated generally as 180 in FIG. 2, a distribution conduit 181 is provided between compressed air collection plenum 130 and annular passageway 182 surrounding housing 140, and fuel/air premixer housing assembly 162 is directly connected to distribution conduit 181 upstream of passageway 182. Valve is disposed at the connection between fuel/air premixer housing assembly 162 and distribution conduit 181 to positively divide the air flow into a first portion flowing to fuel/air premixer 160 and the remainder to passageway 182 via distribution conduit portion 181a. As compared with the embodiment in FIG. 1A, where substantially all of the compressed air portion flowing to the premixer was first used to cool at least a part of housing portion 86 defining combustion chamber 52, none of the compressed air portion flowing to fuel/air premixer 160 is used to cool portions 186 of housing 140 defining combustion zone 152. However, the FIG. 2 embodiment does allow for the direct control of the compressed air fractions flowing to the fuel/air premixer versus the compressed air flow fraction flowing to the dilution ports 158a and 158b. The configuration shown in FIG. 1A may be preferred nonetheless because of an ease of construction in assembly of the various components, principally the fuel/air premixer wherein the valve can be integrated directly with the fuel/air premixer housing, as will be discussed in more detail henceforth.

Further in accordance with the present invention, fuel conduit means is provided interconnecting the fuel supply and the premixer fuel receiving means, the fuel conduit means together with the premixer fuel receiving means establishing a flow path for all the fuel to the premixer. Fuel valve means is disposed in the fuel flow path for determining the fuel flow rate therein. As embodied herein, and with reference again to FIG. 1A, fuel line 66 interconnects fuel source 32 with fuel nozzle 64. Fuel valve 92 is disposed in fuel line 66 immediately upstream of fuel nozzle 64, which is depicted as being an "air-blast" type fuel nozzle particularly suitable for use with liquid fuels, as stated previously.

Still further in accordance with the present invention, the combustor system includes controller means operatively connected both to the compressed air valve means and the fuel valve means for essentially controlling the respective flow rates of the compressed air portion and the fuel delivered to the premixer to provide a preselected lean fuel/air ratio mixture through the inlet port to the combustion zone. As embodied herein and as depicted schematically in FIG. 1A, controller 94 which can be either mechanical or electric (e.g., a microprocessor) is interconnected with compressed air valve 90 to essentially control the flow rate of the compressed air flowing directly to venturi inlet 70. While a small portion (typically 5% or less), of the total compressed air flowing to fuel/air premixer 60 can travel through conduit 88 when an "air-blast" nozzle is utilized, the control provided by valve 90 of the remaining 95+% of the compressed air flow is expected to achieve adequate overall fuel/air ratio control. Moreover, for situations utilizing gaseous fuel, such as natural gas as provided in the Example to be discussed hereinafter, conduit 88 could be eliminated such that all of the compressed air flow to the fuel/air premixer will be under the control of the compressed air flow valve.

Also as depicted in FIG. 1A, controller 94 is operatively connected to fuel valve 92 to meter the fuel flow to fuel nozzle 64. As one skilled in the art would appreciate, controller 94 can act to control both the fuel flow and the compressed air flow to fuel/air premixer 60 to achieve a single preselected fuel/air ratio mixture over the entire operating range of the gas turbine engine module so that the mass flow of the combustible mixture would change as a function of the load. Or, alternatively, controller 94 can be configured to provide a sequence of preselected fuel/air ratio mixtures as a function of load. One skilled in the art would be able to select and adapt a suitable controller for a particular application based on the present disclosure and the general knowledge in the art.

In operation, and with reference to FIGS. 1A and 1B, compressed air from compressed air receiving means 30 is channeled via passageway/envelope 82 over the outside surface of housing 40 for cooling housing 40, and particularly portions 86 which surround combustion zone 54. A portion of the compressed air flowing in passageway 82 is admitted to plenum 84 and then flows to fuel/air premixer 60 via the interconnection between fuel/air premixer housing assembly 62 and 84 as controlled by compressed air valve 90 via controller 94. In venturi 68, the compressed air portion is mixed with the fuel from fuel nozzle 64, possibly with a small additional portion of compressed air if nozzle 64 is a "air-blast" type nozzle, and is injected along the venturi axis 74 through inlet port 43 and into combustion zone 54 of combustion chamber 52.

As shown in FIG. 1B, swirling flow and combustion is provided in combustion zone 54 by locating venturi axis 74 tangentially with respect to axis 42 of the housing. The direction of orientation of the venturi axis 74 is chosen to give a specific angular direction (clockwise or counterclockwise) with respect to the direction of rotation of the turbine in order to provide some aerodynamic unloading of the inlet guide vanes. For the configuration depicted in FIG. 1A and 1B where the fuel/air mixture is admitted to achieve a clockwise swirling combustion in combustion zone 54 as viewed in the direction AA, the direction of rotation of turbine 20 also would be in the clockwise direction. After combustion of the fuel/air mixture in zone 54, the hot exhaust gases pass to dilution zone 56 where dilution air from dilution ports 58a, 58b reduce the average temperature of the exhaust before it is ducted via channel 50 past inlet guide vanes 34 to turbine 20 for work-producing expansion.

The control of combustion afforded by combustion system 10 in accordance with the present invention through the complete mixing of the fuel and air outside the combustion chamber in the fuel/air premixer, including complete vaporization of the fuel if liquid fuel is used, together with the control of the fuel/air ratio of the mixture delivered to the combustion chamber allows for significant reductions in $NO_x$ levels and the levels of unburned fuel and fuel by-products, as mentioned earlier. Furthermore, the utilization of essentially the total amount of compressed air flow to either combust the fuel or to dilute the exhaust gases upstream of the turbine provides considerable reduction of peak combustor temperatures resulting in longer life of combustion liners.

As previously mentioned, the preferred fuel/air premixer of the present invention includes a compressed air receiving means, a venturi having an inlet operatively connected to the compressed air receiving means with air flow smoothing means, a fuel receiving means including a nozzle with an exit positioned to deliver a spray of fuel into the venturi inlet substantially along the venturi axis, and valve means associated with the compressed air receiving means for determining the compressed air flow rate to the venturi inlet. As embodied herein and with reference to FIG. 3A, fuel/air premixer 260 includes air receiving means in the form of housing assembly 262. Components having a like or similar function to those disclosed in the embodiments of FIGS. 1A and 1B will be designated by the same numeral but with a "200" base. Housing assembly 262, in turn, includes housing 300 and housing support 302 for mounting housing 300 on pressure vessel 214 of gas turbine engine module 212. Housing support 302 is hollow and, in addition to supporting housing 300 and the components contained therein, acts to channel compressed air from plenum 284 to housing 300. In the construction shown in FIG. 3A, liner member 303 is positioned between combustion chamber housing 240 and pressure vessel 214 for establishing the flow path 282, at least in the vicinity of portions 286 of housing 240 that define the boundary of the combustion zone 254. Liner member 303 also defines with pressure vessel 214, plenum 284 for collecting the compressed air portion for eventual transmission to housing 300 via housing support 302.

Figure 3A:
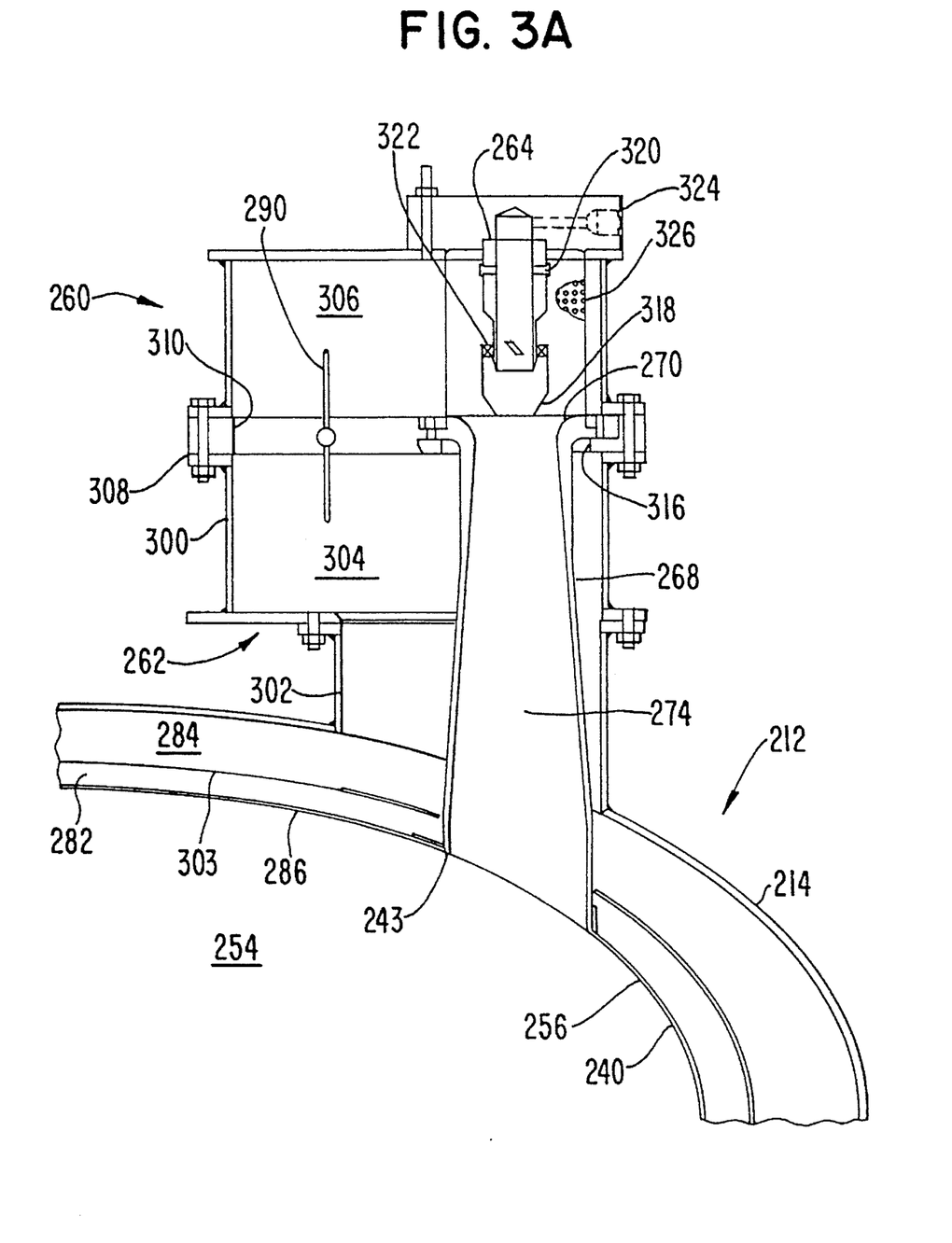
FIGS. 3A–3C are detailed cross sectional views of a test version of the preferred fuel/air premixer component of the apparatus shown in FIG. 1A.

With continued reference to FIG. 3A, fuel/air premixer housing 300 is divided into upstream and downstream compartments 304, 306 respectively by divider plate 308. Aperture 310 is provided in divider plate 308, and a butterfly-type valve plate 290 is mounted for rotation in aperture 310. In the FIG. 3A embodiment, the orientation of valve plate 290 in aperture 310 is controlled through control arm 312 (see FIG. 3B) to provide a selective degree of obstruction and, hence, pressure drop. In the orientation of valve plate 290 shown in FIGS. 3B and 3C, a minimum amount of obstruction occurs with valve plate 290 being oriented perpendicular to the divider plate 308, corresponding to a "zero" setting of the angular calibration plate 314 shown in FIG. 3C. A position of control rod 312 corresponding to either "9" position on indicator 314 would result in the greatest amount of obstruction and pressure drop in the compressed air portion flowing through aperture 310. As one skilled in the art would realize, the degree of obstruction and thus control of the compressed air flow between upstream compartment 304 and downstream compartment 306 could be varied by changing the angular orientation of control rod 312 between the "zero" and "9" positions, thereby controlling the compressed air flow rate to the balance of the fuel/air premixer 260 which will now be described in more detail.

Divider plate 308 includes an additional aperture 316 in which is mounted inlet 270 of venturi 268. Venturi inlet 270 is configured and mounted to divider plate 308 such that a smooth transition exists between the upper planar surface of divider plate 308 and the inner surface of venturi inlet 270. Venturi 268 extends through upstream housing compartment 304, housing support 302, past pressure vessel 214, combustion chamber liner 303, and connects to housing 240 at the location of inlet port 243. As described previously in relation to the embodiment depicted in FIG. 1A, the venturi axis 274 which corresponds generally to the flow direction of the fuel/air mixture in venturi 268 is oriented to provide a substantially tangential admission direction with respect to the axis (not shown) of annular combustion chamber housing 240.

With continued reference to FIG. 3A, fuel nozzle 264 is mounted in downstream compartment 306 with the fuel nozzle exit 318 positioned to deliver a spray of fuel into venturi inlet 270 along venturi axis 274. Fuel nozzle 264 is of the "swirling" spray type which utilizes ports 320 and swirl vanes 322 to channel some of the compressed air swirl the fuel entering through fuel port 324 before releasing the fuel spray through exit 318. Also shown in FIG. 3A is perforated flow-smoothing element 326 positioned in the downstream compartment 306 and surrounding fuel nozzle exit 318 and venturi inlet 270, to avoid uneven velocities and separation in the venturi which otherwise could result in "flame holding" in the venturi. While a small pressure drop is introduced by its incorporation, the perforated element 326 has been found to provide increased stability for the compressed air flow from downstream compartment 306 past the fuel nozzle 264 and into venturi inlet 270, without any separation at the lip of venturi inlet 270.

Figure 3B:
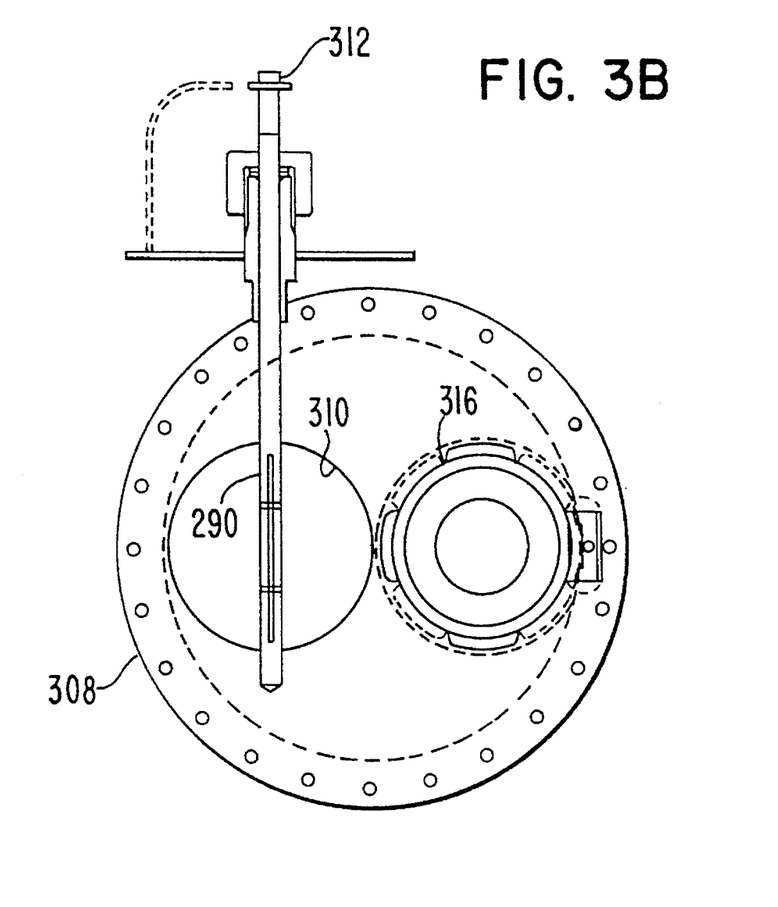
Figure 3C:
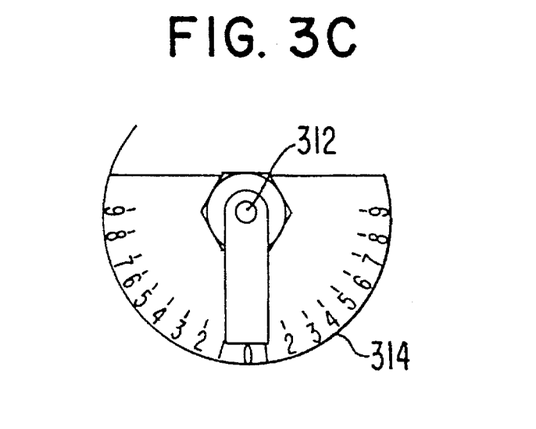
Figure 4:
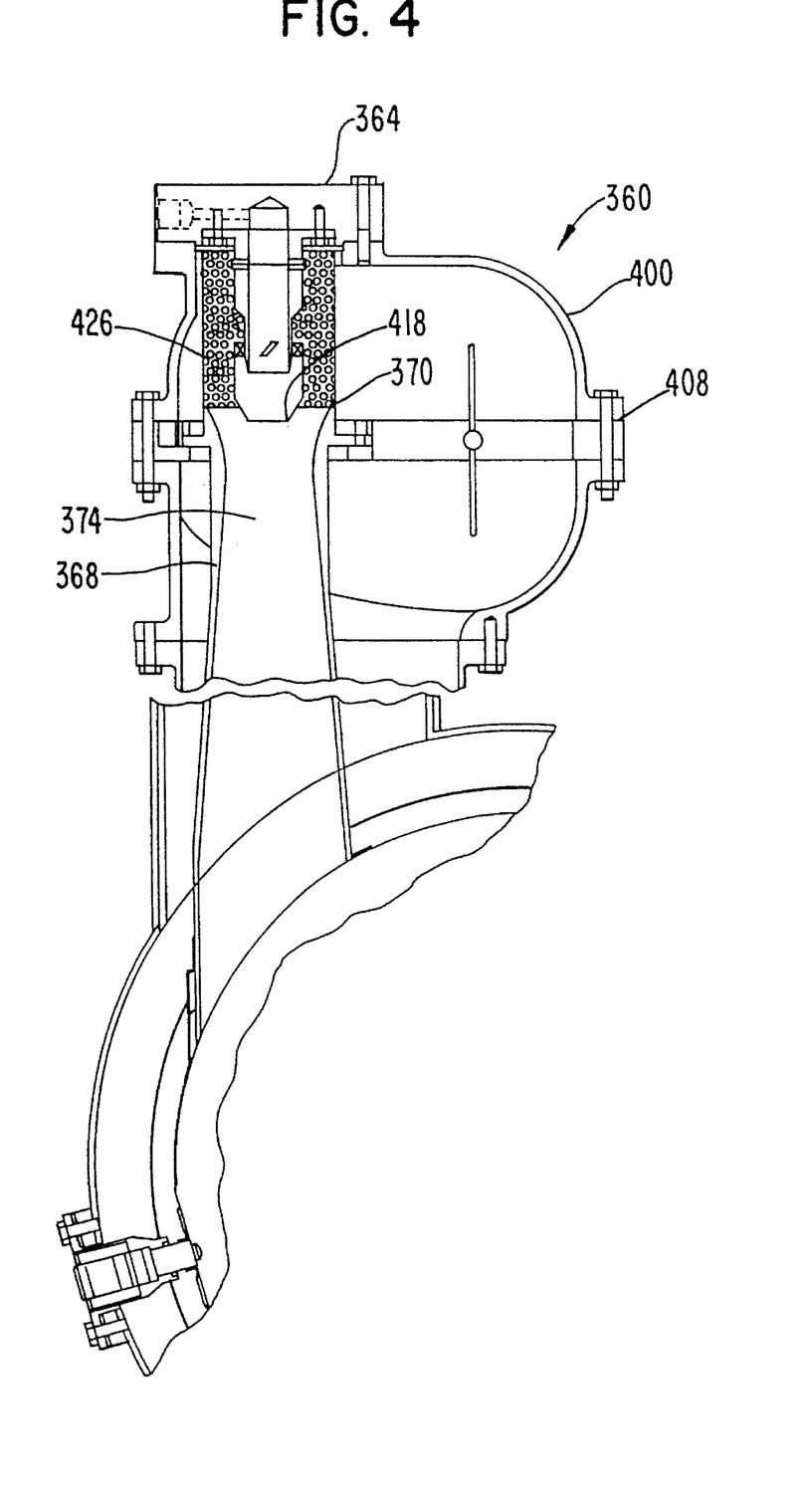
FIG. 4 is a detailed cross sectional view of an engine version variation of the fuel/air premixer shown in FIGS. 3A–3C.

FIG. 4 shows a contemplated commercial variation of the preferred fuel/air premixer depicted in FIGS. 3A–3C, which variation is designated generally by the numeral 360. Components having the same or similar function to those described in relation to the FIG. 1A, 1B embodiment are given the same numerals but with "300" base. Fuel/air premixer 360 includes a venturi 368 which has inlet 370 which extends slightly above the surface of divider plate 408. Also, fuel nozzle exit 418 extends a distance into venturi inlet 370. One skilled in the art would realize that the optimum performance of the fuel nozzle 364 in conjunction with the venturi 368 (as well as nozzle 264 and venturi 268 in the variation shown in FIGS. 3A–3C) may vary from application to application and that the positioning of fuel nozzle exit 418 along the venturi axis 374 in the vicinity of venturi inlet 370 may be adjusted to determine the optimum position. However, it is anticipated that perforated screen element 426 would provide flow stability for the FIG. 4 embodiment as well. Finally, the FIG. 4 embodiment incorporates contemplated refinements in the construction of the fuel/air premixer compared to the construction shown in FIG. 3A, such as the use of integral, bell-shaped housing 400.

EXAMPLE

In order to assess the performance of the annular combustor system of the present invention, an annular combustor having the fuel/air premixer as shown in FIGS. 3A–3C was atmospherically tested using an external source of air and a gaseous fuel (natural gas). Table 1 presents values of the important dimensions of the apparatus used in the test.

TABLE 1

| | |
|---|---|
| Volume of combustion chamber | $(12.3 \times 10^{-3} m^3)$ |
| Outer diameter of combustion zone | (0.346 m) |
| Inner diameter of combustion zone | (0.200 m) |
| Radial distance from the housing axis to the venturi axis | (0.124 m) |
| Diameter of the venturi | |
| Throat | (45 mm) |
| Exit | (75 mm) |
| Perforated element hole diameter and pitch | (Ø3.75 × 5 mm) |

Tests were done at flow conditions corresponding to idle and full load. Flow rates to achieve a preselected fuel/air ratio were set by manually setting compressed air valve 290 and the fuel valve (not shown) rather than by a controller element although a controller element could have been used. Table 2 presents the fuel and compressed air flow rates and other important parameters as well as the measured $NO_x$ levels and approximate CO emission levels for the tests.

TABLE 2

| | IDLE | FULL LOAD |
|---|---|---|
| BTU rating of natural gas (MJ/kg) | 38.02 | 38.02 |
| Fuel flow rate (g/s) | 2.45 | 3.12 |
| Total air flow rate: (g/s) | 183 | 160 |
| Fuel/Air Ratio | 0.033 | 0.033 |
| Compressed air inlet temperature (°C.) | 376 | 430 |
| Total pressure loss (percent): | 5 | 3 |
| Total air factor: | 2.3 | 2.3 |
| Pattern factor (percent): | 11 | 8 |
| $NO_x$ (ppm) at 15% $O_2$: | 5 | 3 |

The above indicates remarkably low $NO_x$ emission levels which, even if scaled for high pressure operation, still would be well below the values considered representative of state of the art gas turbine engine module combustor systems using premixers. See G. Leonard et al., "*Development of Aero Derivative Gas Turbine DLE Combustion System*", Diesel and Gas Turbine Worldwide, May 1993, pp. 22 and 24.

With the above detailed description of the annular combustor system and fuel/air premixer apparatus and method of operating same of the present invention, those skilled in the art would appreciate that modifications may be made to the invention without departing from its spirit. Therefore, it is not intended that the scope of the invention be limited to the specific embodiments illustrated and described above. Rather, it is intended that the scope of this invention be determined by the appended claims and their equivalents.

What is claimed is:

1. Combustor system for operation with a source of compressed air and a source of fuel, the combustor comprising:

cylindrical combustion liner housing defining a single stage combustion chamber, said housing having an axis and having at least one inlet port adjacent one axial chamber end, the portion of said chamber adjacent said one axial chamber end comprising a single stage combustion zone, an exhaust port at the opposite axial chamber end, the portion of said chamber adjacent said opposite axial chamber end comprising a dilution zone, and said housing also having aperture means into said dilution zone;

at least one fuel/air premixer disposed outside said cylindrical housing and having means for receiving compressed air, means for receiving fuel, and premixer chamber means for mixing the received compressed air and fuel and delivering the mixture to said combustion zone through said inlet port;

first conduit means interconnecting the source of compressed air and said premixer and, together with said premixer compressed air receiving means, establishing a compressed air flow path for delivering a portion of the compressed air to said premixer, said first conduit means also for delivering essentially the remaining portion of the compressed air to said aperture means;

first valve means disposed in said compressed air flow path for essentially determining the compressed air flow rate to said premixer;

second conduit means interconnecting the fuel supply and said premixer fuel receiving means and, together with said premixer fuel receiving means, establishing a flow path for all the fuel to the premixer;

second valve means disposed in said fuel flow path for determining the fuel flow rate therein; and controller means operatively connected to said first and second valve means for essentially controlling the respective flow rates of said compressed air portion and fuel to said premixer to provide a preselected lean fuel/air ratio mixture through said inlet port to said combustion zone over substantially the entire operating range of the combustor system;

wherein said first conduit means include at least one passageway for convectively cooling the part of said cylindrical housing defining said combustion zone with at least the remaining portion of the compressed air, the compressed air flowing in said passageway being sealed off from said combustion zone by said defining housing part, and wherein said first conduit means also provides for convectively cooling said defining housing part with the portion of compressed air flowing to said premixer compressed air receiving means.

2. The combustor system as in claim 1, wherein said first valve means is integrated with said premixer compressed air receiving means.

3. Combustor system for operation with a source of compressed air and a source of fuel, the combustor comprising:

cylindrical combustion liner housing defining a single stage combustion chamber, said housing having an axis and having at least one inlet port adjacent one axial chamber end, the portion of said chamber adjacent said one axial chamber end comprising a single stage combustion zone, an exhaust port at the opposite axial chamber end, the portion of said chamber adjacent said opposite chamber end, the portion of said chamber adjacent said opposite axial chamber end comprising a dilution zone, and said housing also having aperture means into said dilution zone;

at least one fuel/air premixer disposed outside said cylindrical housing and having means for receiving compressed means for receiving fuel, and premixer chamber means for mixing the received compressed air and fuel and delivering the mixture to said combustion zone through said inlet port;

first conduit means interconnecting the source of compressed air and said premixer and together with said premixer compressed air receiving means, establishing a compressed air flow path for delivering a portion of the compressed air to said premixer, said first conduit means also for delivering essentially the remaining portion of the compressed air to said aperture means;

first valve means disposed in said compressed air flow path for essentially determining the compressed air flow rate to said premixer;

second conduit means interconnecting the fuel supply and said premixer fuel receiving means and, together with said premixer fuel receiving means, establishing a flow path for all the fuel to the premixer;

second valve means disposed in said fuel flow path for determining the fuel flow rate therein; and controller means operatively connected to said first and second valve means for essentially controlling the respective flow rates of said compressed air portion and fuel to said premixer to provide a preselected lean fuel/air ratio mixture through said inlet port to said combustion zone over substantially the entire operating range of the combustor system;

wherein said premixer chamber means includes a venturi having an inlet, an outlet, and a flow axis, said venturi inlet being flow connected to said compressed air receiving means and said fuel receiving means, and said outlet being connected to said housing inlet port to deliver the fuel/air mixture to said combustion zone, said venturi being disposed with said flow axis being aligned in a substantially tangential direction with respect to said housing axis.

4. The combustor system as in claim 3, wherein said premixer fuel receiving means includes at least one fuel nozzle positioned to direct a fuel stream into said venturi inlet substantially along said venturi axis.

5. The combustor system as in claim 4, wherein said premixer fuel nozzle is an air blast nozzle to provide initial premixing of the fuel and air, and wherein said first conduit means includes a conduit member directly interconnecting the source of compressed air and said air blast nozzle.

6. The combustor system as in claim 5, wherein the fuel is liquid fuel, and wherein said air blast nozzle also provides atomization of the liquid fuel prior to entry into said venturi inlet.

7. The combustor system as in claim 4, wherein said premixer fuel receiving means has only said one fuel nozzle.

8. The combustor system as in claim 4, wherein said fuel nozzle is spaced from said venturi inlet along the venturi axis direction to provide an optimum inlet flow path for the compressed air into said venturi inlet; and wherein a flow-smoothing member is positioned in said inlet flow path.

9. The combustor system as in claim 1, having only said one fuel/air premixer for providing the fuel/air mixture to said combustion zone.

10. A gas turbine engine module including the combustor system of claim 1 and further including air compressor means, turbine means interconnected to drive said air compressor means, and an exhaust gas flow path connecting said exhaust port and said turbine means, wherein said first conduit means is operatively connected to said air compressor means, wherein essentially all of the remaining portion of compressed air from said air compressor means is admitted to said exhaust flow path upstream of said turbine means, and wherein said controller means provides said preselected lean fuel/air ratio over substantially the entire operating range of the gas turbine engine module.

11. A gas turbine engine module including the combustor system of claim 3 and further including a turbine, an exhaust flow path to channel combustion gases from said exhaust port to said turbine, and inlet guide vanes positioned in said exhaust flow path upstream of said turbine, wherein said substantially tangential alignment direction of said venturi axis is selected relative to the direction of rotation of said turbine to aerodynamically partly unload said inlet guide vanes.

12. A combustor system for burning fuel with compressed air, comprising:

- a combustion liner housing defining a single stage combustion chamber, said combustion chamber having a combustion zone and a dilution zone downstream of said combustion zone;
- a first passageway surrounding said combustion chamber for receiving compressed air to convectively cool said combustion liner housing, said first passageway having at least one aperture therein for delivering compressed air to the dilution zone of said combustion chamber, said at least one aperture having a fixed and unadjustable cross-sectional area;
- at least one fuel/air premixer;
- a second passageway, flow connected to said first passageway, for delivering compressed air to said at least one fuel/air premixer;
- a fuel conduit for delivering fuel to said at least one fuel/air premixer, and a fuel valve for controlling the amount of fuel delivered through said fuel conduit, said at least one fuel/air premixer being disposed outside of said combustion chamber and having a mixing chamber for mixing the fuel and air and an outlet for delivering the mixture of fuel and air to said combustion zone;
- at least one valve disposed in said second passageway for directly controlling the amount of compressed air delivered to said at least one fuel/air premixer, and for indirectly controlling the amount of compressed air flowing into said first passageway by adjusting the pressure drop through said second passageway; and
- a controller operatively connected to said fuel valve and said at least one valve disposed in the second passageway for controlling the amounts of fuel and compressed air delivered to the fuel/air premixer to provide a preselected lean fuel/air ratio mixture to said combustion zone over substantially the entire operating range of the combustor system,
- said premixer mixing chamber including a venturi having an inlet and a flow axis, said venturi inlet being flow connected to said second passageway and said fuel conduit, and said combustion chamber having a flow axis, said venturi being disposed with its flow axis being aligned in a substantially tangential direction with respect to said flow axis of said combustion chamber.

13. The combustor system as in claim 12, including at least one fuel nozzle positioned to direct a fuel stream into said venturi inlet of said premixer substantially along said venturi axis.

14. The combustor system as in claim 13, wherein said fuel nozzle is an air blast type nozzle to provide initial premixing of the fuel and air, and including a conduit directly interconnecting the source of compressed air and said air blast nozzle.

15. The combustor system as in claim 14, wherein the fuel is liquid fuel, and wherein said air blast nozzle also provides atomization of the liquid fuel prior to entry into said venturi inlet.

16. The combustor system as in claim 13, wherein said fuel nozzle is spaced from said venturi inlet along the venturi axis direction to provide an optimum inlet flow path for the compressed air into said venturi inlet; and wherein a flow-smoothing member is positioned in said inlet flow path.

* * * * *

UNITED STATES PATENT AND TRADEMARK OFFICE
CERTIFICATE OF CORRECTION

PATENT NO. : 5,481,866
DATED : January 9, 1996
INVENTOR(S) : R. Jan MOWILL

It is certified that error appears in the above-indentified patent and that said Letters Patent is hereby corrected as shown below:

In Claim 3, col. 13, line 57, after "pressed" insert --air,--;

line 62, before "together" insert --,--.

Signed and Sealed this

Twenty-first Day of May, 1996

Attest:

BRUCE LEHMAN

Attesting Officer     Commissioner of Patents and Trademarks